United States Patent Office 2,751,388
Patented June 19, 1956

2,751,388

PROCESS FOR PREPARING BENZHYDRYL ETHERS

Joseph Levy, Union, N. J., assignor to Nopco Chemical Company, Harrison, N. J., a corporation of New Jersey No Drawing. Application April 7, 1950,
Serial No. 154,731

12 Claims. (Cl. 260—294.7)

This invention relates to a new process for preparing benzhydryl ethers and more particularly to a new process for preparing benzhydryl ethers having antihistaminic, anesthetic and antispasmodic activity.

The process of my invention is particularly useful in preparing ethers of the types disclosed in U. S. Patents No. 2,421,714, No. 2,427,878, No. 2,453,729, No. 2,454,092 and No. 2,455,949 of Rieveschl and U. S. Patent No. 2,479,843 of Knox and Kapp. The products of these patents can all be prepared by the reaction of benzhydryl halides with tertiary amino alcohols. Variations of the compounds of these patents which are substituted either in the phenyl groups or which have other constituents in place of the alkyl groups in the various compounds may also be readily prepared by the process of my invention. My process is also particularly applicable to the preparation of other ethers having a structure somewhat similar to the structure of the various ethers described in the above patents.

It is the object of this invention to provide an improved process for the preparation of benzhydryl ethers.

Another object of the invention is to provide an improved process for reacting benzhydryl halides with amino alcohols the amino group of which is a tertiary amino group and the radicals of which are selected from alkyl, cycloalkyl, aralkyl, aryl and heterocyclic radicals.

Other objects of the invention will in part be obvious and will in part appear hereinafter.

The above and other objects of the invention are accomplished by reacting the desired benzhydryl halide with the desired tertiary amino alcohol in the presence of a tertiary amine the radicals of which are selected from the group consisting of alkyl, cycloalkyl and aralkyl radicals, each of the three radicals of the tertiary amine containing from 3 to 10 carbon atoms. The reaction can be carried out in the presence of a solvent in which the halide salts of the resulting benzhydryl ether compound are relatively insoluble, if desired.

It has been proposed in the prior art for the preparation of benzhydryl ethers to carry out the reaction of benzhydryl halides with tertiary amino alcohols in the presence of acid binding agents, i. e. with agents which will combine with the hydrogen halide formed by the reaction between the benzhydryl halide and the tertiary amino alcohol and thus neutralize the hydrogen halide so that it will not interfere in any manner with the desired reaction. Thus it has been proposed to employ basic compounds such as sodium carbonate, pyridine, and aromatic amines such as dialkyl anilines, etc. as acid binding agents. In many cases excess amounts of the tertiary amino alcohol itself either with or without alkali carbonate are employed to neutralize the hydrogen halide which is formed by the reaction. In such cases the liberated hydrogen halide either combines with the excess amino alcohol or reacts with the alkali carbonate, and on completion of the reaction the desired benzhydryl ether is isolated from the reaction mixture as the free base. Where the amino alcohol is expensive and not readily available this procedure is obviously undesirable, employing, as it does, excess amounts of the amino alcohol. In other procedures of the prior art where a benzhydryl halide is reacted with an alkali metal alkoxide of the amino alcohol or where a tertiary amino alkyl halide is reacted with a benzhydryl alkoxide, the benzhydryl ether is also isolated as the free base and the yields are frequently low. It might appear at first glance that the process of my invention operates in the same manner as the prior art procedures which employ acid binding agents. However, that is not the case since I have found that when operating in accordance with my procedure, the hydrogen halide which is formed in the reaction does not combine with the tertiary aliphatic amine but instead it combines with the benzhydryl ether compound which is the desired product of the reaction so that this product is obtained directly as the hydrohalide salt in relatively pure form. Furthermore, I have found that while the reaction may be carried out with equimolecular amounts of the benzhydryl halide and the amino alcohol, best results, contrary to the prior art, are obtained when the benzhydryl halide is used in moderate excess. Excellent yields of the desired benzhydryl ether are obtained in such cases, and highly efficient utilization is made of the amino alcohol which is, of course, highly desirable in those cases where this material is expensive and not readily available. However, even when the yield is calculated from the benzhydryl halide, which is used in excess, it is in many cases much higher than the yields of the prior art. Since the process of my invention does form the hydrohalide salt of the desired ether compound, it is highly advantageous in two very important respects as compared to the prior art processes. First, it greatly simplifies the recovery of the desired ether from the reaction mixture, and secondly, it frequently eliminates the additional step in the prior art processes of converting the ether compound to a hydrohalide salt or other water-soluble salt thereof. As is well known, the benzhydryl ether compounds are usually administered in the form of water-soluble salts such as their hydrohalide salts.

As yet I have not determined how the tertiary alkyl amine which is employed in my process operates to bring about the unexpected results which are obtained. It is clear, however, that it does not operate as an acid binding agent since it does not combine with the hydrogen halide which is formed in the reaction. This is all the more evident in view of the fact that my procedure in many cases gives yields far superior to those obtained in the prior art procedures which employed acid binding agents.

Thus by preparing ethers in accordance with the process of my invention, it is possible in most cases to eliminate many of the steps previously required in isolating the desired ether compounds from the reaction media. For example, in the prior art procedures it is necessary to go through rather involved processes for recovering the desired ethers from the reaction mixtures. When operating in accordance with my process, however, the hydrohalide salts of the desired benzhydryl ethers will be formed and in most cases these salts are readily crystallized and separated from the remainder of the reaction mixture by addition of a suitable solvent. When the process is carried out in the presence of a solvent in which the hydrohalide salts of the ethers are relatively insoluble, the hydrohalide salts crystallize almost as soon as they are formed in the reaction and may readily be separated from the reaction mixture in very pure form by simple filtration. The solvent will carry along with it substantially all materials in the reaction mixture except the hydrohalide salts of the ethers which have been produced. As mentioned above, in many instances, and particularly in the production of the compounds disclosed in the Knox and Kapp patent, much higher yields of the desired ethers are obtained by my process than when operating in accordance with the prior art procedures for preparing these compounds. Thus, for example, the Knox and Kapp process gives yields of about 39% based upon the amount of benzhydryl halide employed whereas the process of my invention when employed to produce the Knox and Kapp products will give yields of the order of 60% or greater based upon the total amount of benzhydryl halide (used in excess) which is employed and yields of 85% or more based on the amount of piperidinol used. A further advantage of my process is that it is unnecessary to employ an excess of the organic base, i. e. piperidinol compounds, in my process, as is the case in the preferred procedure of the Knox and Kapp process, and thus a much more efficient utilization of the piperidinol is made. Since the piperidinol compounds are much more expensive than the benzhydryl halides, it is evident that it would be highly desirable to have available a process wherein it would be unnecessary to employ such excess piperidinol. Based on the amount of piperidinol employed in the Knox and Kapp process, the yield of the desired benzhydryl ether is only 19% of the theoretical yield. However, with my process one can consistently obtain yields of 85% or greater based on the amount of piperidinol employed.

In carrying out the process of my invention, I employ a ratio of benzhydryl halide to tertiary amino alcohol of at least about one mole of halide per mole of alcohol and in my preferred process I employ approximately one and a half moles of halide for each mole of the alcohol since the optimum yields are usually obtained with such a ratio. Larger amounts of the halide per mole of alcohol may be employed but in most cases there is no particular advantage in so doing. The amount of the tertiary amine which is employed in the process should in most cases be approximately the same number of moles as the amount of tertiary amino alcohol which is being utilized in the reaction. Larger amounts of the tertiary amine, e. g. about one and one-half moles per mole of the tertiary amino alcohol, can be used if desired. If a solvent is employed in the reaction, the amount thereof should be sufficient to give a reaction mixture from which the hydrohalide salt of the ether will crystallize readily and be easily filtered after cooling the reaction mixture to room temperature or below on completion of the reaction.

Any tertiary amine the radicals of which are selected from the group consisting of alkyl, cycloalkyl, or aralkyl radicals and each of the three radicals of which contain from 3 to 10 carbon atoms can be employed in the process of my invention. It is preferred that the tertiary amine be a symmetrical amine, i. e. that each of the three radicals in the amine be the same. However, if desired, tertiary amines containing mixed radicals may be employed. Among the tertiary amines which I prefer to employ in my invention are amines such as tripropylamine, tributylamines, triamylamine, trihexylamine, triheptylamine, trioctylamine, benzyl dibutylamine, benzyl diamylamine, amyl dicyclohexylamine, amyl benzyl cyclohexylamine, etc. The tertiary amine is readily recovered from the reaction mixture after the insoluble hydrohalide salt of the benzhydryl ether has been filtered therefrom, e. g. by extraction of the tertiary amine with aqueous acid followed by liberation of the free base with alkali and subsequent distillation.

Since the hydrohalide salt of the ether is formed by my novel process, it is in most cases readily separated from the other constituents in the reaction mixture on the completion of the reaction by admixing the reaction mixture with any of a number of different solvents in which the hydrohalide salts of the benzhydryl ethers are relatively insoluble and the rest of the reaction mixture is soluble. Thus by admixing a suitable solvent such as various aliphatic ketones, aliphatic esters, aromatic hydrocarbons, etc., e. g. benzene, toluene, xylene, methyl ethyl ketone, methyl propyl ketone, methyl isobutyl ketone, isopropyl acetate, etc. with the reaction mixture, the hydrohalide salt of the desired benzhydryl ether will ordinarily be found to be substantially insoluble in the solvent on cooling the mixture to room temperature or below whereas the remainder of the reaction mixture will be substantially soluble therein. Then by merely filtering the mixture, the desired hydrohalide salt of the benzhydryl ether will be obtained in a very pure form. It is often desirable, although not necessary, to employ such a solvent as a medium in which to carry out the reaction, and in many such cases it will be found that the hydrohalide salt of the desired benzhydryl ether will crystallize from the reaction mixture during the reaction and when the reaction mixture is cooled on completion of the reaction substantially all of the desired benzhydryl ether which has been formed will crystallize from the mixture in the form of the hydrohalide salt which may then be readily recovered by filtration or similar means. It is apparent, therefore, that it is much simpler in most cases to recover the desired ether in my process than in the procedures of the prior art. Inasmuch as many of these ether compounds are administered in the form of their hydrohalide salts, the crystalline hydrohalide salts obtained by my process are ready for immediate use and need not be converted to any other form prior to being administered. In addition to the much greater ease of recovery of the desired products, I have found that the process of my invention will in most cases give much higher yields of the desired products than is obtained in many of the prior art procedures. Furthermore, the reaction time required for my process is often much shorter than that required in the prior art procedures particularly when the tertiary amino alcohol which is being employed is a piperidinol.

Any of the various benzhydryl halides may be employed in the process of my invention. In most cases it is preferred to use either the benzhydryl chloride or the benzhydryl bromide of the particlar benzhydryl compound which is employed inasmuch as the benzhydryl ethers which are produced are readily administered in the form of either the bromide or the chloride salts of the ethers. The benzhydryl halides which are suitably employed in my process are the benzhydryl halides themselves or derivatives thereof having various constituents substituted in the phenyl groups, e. g. benzhydryl halides which are substituted in either or both of the phenyl groups with halides, alkyl groups, alkoxy groups, etc. As far as the various alcohols which may be employed in my process are concerned, any of a large number of amino alcohols containing a tertiary amino group the radicals of which are selected from the group consisting of alkyl, cycloalkyl, aralkyl, aryl and heterocyclic radicals can be utilized. Among the numerous alcohols which can be utilized in my process, there may be mentioned the nitrogen substituted piperidinols, aliphatic amino alcohols, such as dimethylaminoethanol, diethylaminoethanol and diethylaminopropanol, heterocyclic aminoalcohols such as piperidino and morpholino ethyl and propyl alcohols, etc.

Illustrative examples of benzhydryl ethers which are advantageously prepared by reacting a benzhydryl halide with a tertiary amino alcohol in accordance with the process of my invention are compounds such as the following:

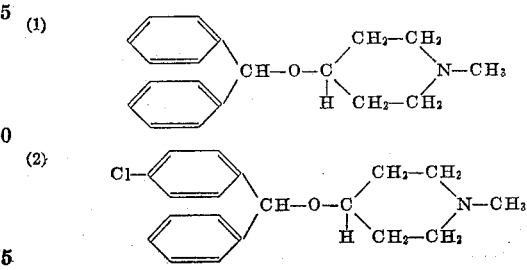

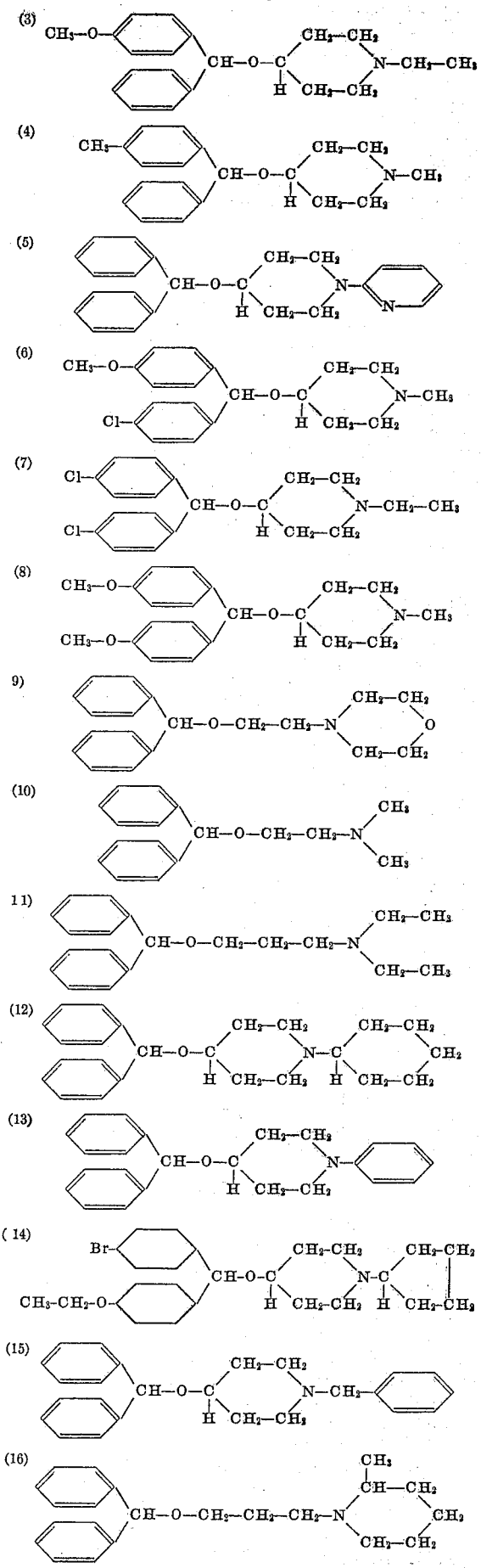
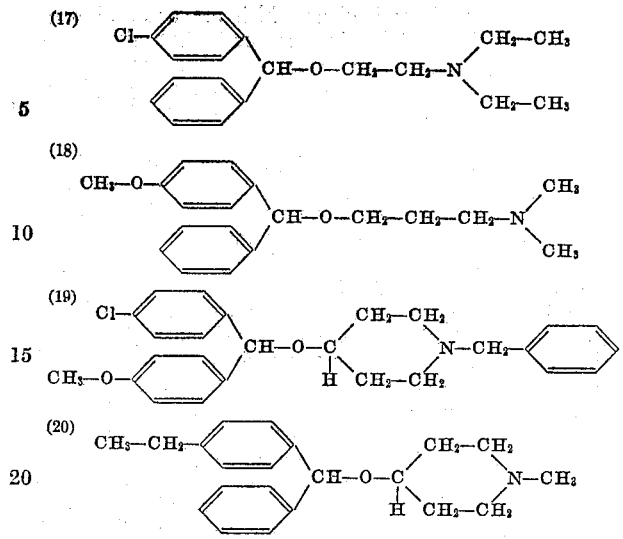

In carrying out the process of my invention, the reaction mixture is ordinarily heated to a temperature of at least about 100° C. and preferably to a temperature between about 120° C. and 175° C. In some instances such as in the preparation of p,p'-dimethoxy benzhydryl ether of 1-methyl-4-piperidinol the reaction may be carried out at temperatures as low as about 80° C., but the yield obtained at such temperatures is not as satisfactory as when the reaction is carried out at the preferred higher temperatures. When the reaction is carried out in a solvent, the reaction may readily be carried out by heating the reaction mixture at the reflux temperature of the solvent for the required length of time. In such a case, of course, the solvent employed should be one having a boiling point at or near the temperature at which it is desired to carry out the reaction. I have found that the benzhydryl chlorides in most cases require a slightly higher temperature than the corresponding benzhydryl bromides for the most efficient reaction. Thus it is often desirable when employing a benzhydryl chloride to use a reaction temperature as high as about 150° C. although excellent results may be obtained at lower temperatures provided longer reaction times are utilized. When the preferred reaction temperatures are employed, it will be found that the reaction ordinarily will be complete in from about one to six hours. This is another outstanding advantage of my process as compared to some of the prior art processes inasmuch as certain of the benzhydryl ethers are not satisfactorily produced by the prior art procedures unless the reaction mixtures are heated for at least about 24 hours. As pointed out above, in my process as the reaction proceeds the hydrohalide salt of the ether will often crystallize from the reaction mixture. This occurs to a certain extent in some cases even when no solvent has been employed as a medium in which to carry out the reaction.

On completion of the process of the invention, the desired end product may readily be recoverd by admixing a solvent in which the hydrohalide salt of the benzhydryl ether is substantially insoluble and in which the rest of the reaction mixture is substantially soluble with the reaction mixture if such a solvent has not been employed as a medium in which to carry out the reaction. Then it is preferred to cool this mixture to room temperature or to a temperature somewhat below room temperature, e. g. about 0° to 5° C., and then separate the hydrohalide salt of the benzhydryl ether from the remainder of the mixture. The crystalline hydrohalide salt is separated from the mixture by filtration, centrifugation or any other suitable means. The hydrohalide salt may then be further purified if desired by one or two recrystallizations from some suitable solvent such as isopropanol or a mixture of isopropanol and heptane. The hydrohalide salts of the benzhydryl ethers which are obtained may be employed in administering the benzhydryl ether compound to a patient or the benzhydryl ether may be converted to some other salt such as the sulfate, phosphate, acetate, citrate, oxalate, succinate, maleate, benzoate, tartrate, oleate, etc.

I have found that in a few instances the hydrohalides of some of the benzhydryl ethers do not readily form crystalline salts but instead they remain in the form of viscous oils. This is particularly the case with the p-chlor benzhydryl ether, the p,p'-dichlor benzhydryl ether, the p-brom benzhydryl ether and the p-methoxy benzhydryl ether prepared by reacting the corresponding benzhydryl halides with 1-methyl-4-piperidinol. However, the desired benzhydryl ethers in such cases are produced in a high yield by the process of my invention, and these ethers can be converted to solid crystalline salts by converting these benzhydryl ethers to salts of organic acids such as the maleate, tartrate, succinate, citrate, etc. salts of these ethers. The benzhydryl ethers are readily isolated from the reaction mixtures by extracting the reaction mixtures with a dilute aqueous solution of an acid, e. g. with a dilute aqueous hydrochloric acid, acetic acid, etc. solution. The free benzhydryl ether is then liberated from the aqueous acid solution by addition of excess alkali, and it is then reacted with the desired organic acid to form a crystalline salt. The tertiary amines employed in the process of the invention are extracted from the reaction mixtures along with the desired benzhydryl ethers in this procedure; but since salts of such tertiary amines with organic acids are highly soluble in a number of organic solvents, particularly alcohols, in which organic acid salts of the desired benzhydryl ethers are relatively insoluble, the desired organic acid salts of the benzhydryl ethers are readily separated in pure form from the salts of the tertiary amines. If desired, benzhydryl ethers which are readily recovered as crystalline hydrohalides may be converted to salts of organic acids by liberating the free bases from the hydrohalide salts with alkali and then reacting the free bases with the desired organic acids.

For a fuller understanding of the nature and objects of the invention, reference may be had to the following examples which are given merely as further illustrations of the invention and are not to be construed in a limiting sense.

*Example I*

465 grams of benzhydryl bromide (1.875 mols) were added to a solution of 144 grams of 1-methyl-4-piperidinol (1.25 mols) and 232 grams of tributylamine (1.25 mols) in 625 ml. of methyl isobutyl ketone and the mixture heated under reflux with stirring for 5 hours. A viscous oil separated almost immediately after the reaction began. This oil gradually redissolved as the reaction proceeded. Crystallization of the desired bromide salt commenced after about one hour. At the end of the 5 hour reaction period, the mixture was cooled to about 5° C. and the crystalline precipitate which had formed was filtered from the reaction mixture and washed free of adhering colored material with cold methyl isobutyl ketone. The yield was 385 grams of colorless needles melting at 207-8° C. which was 85.5% of the theoretical yield based on the amount of 1-methyl-4-piperidinol employed. The product was the hydrobromide salt of 1-methyl-piperidyl-4-benzhydryl ether. It can be recrystallized from isopropanol if desired.

*Example II*

15.2 grams of benzhydryl chloride (0.075 mol) were added to a solution of 5.75 grams of 1-methyl-4-piperidinol (0.05 mol) in 9.22 grams of tributylamine (0.05 mol) and the mixture heated at 150–155° C. with stirring for five hours. An amber oil separated after a short time. This was gradually transformed to the desired ether hydrochloride as the heating continued. Crystallization of the ether hydrochloride commenced after about 4 hours of heating. Twenty-five ml. of methyl isobutyl ketone were then added and the mixture further heated under reflux for 1 hour. The mixture was then cooled to about 5° C. and the crystalline precipitate was filtered from the reaction mixture and washed free of adhering mother liquor with 50 ml. of cold methyl isobutyl ketone. A yield of 13.5 grams of almost colorless needles melting at 205–7° C. was obtained which was 85% of the theoretical yield based on the amount of 1-methyl-4-piperidinol employed. The product is the hydrochloride salt of 1-methyl-piperidyl-4-benzhydryl ether. On recrystallization from isopropanol-heptane, it gave colorless needles melting at 207–9° C. Another reaction was carried out in the same manner except that 10 ml. of methyl isobutyl ketone were admixed with the reactants before the heating period was started, and then 15 ml. of methyl isobutyl ketone were added after the reaction had been completed and prior to recovering the desired product by crystallization. The same excellent results were obtained. The reaction was repeated three times using 25 ml. of amyl acetate, 25 ml. of methyl amyl ketone, and 25 ml. of xylene respectively as reaction mediums. Excellent results were likewise obtained in these three experiments.

*Example III*

A mixture of 5.75 grams of 1-methyl-4-piperidinol (0.05 mol), 18.5 grams of benzhydryl bromide (0.075 mol), 10.8 grams of tripropylamine (0.075 mol) and 25 ml. of naphtha having a boiling point of from about 115° to 130° C. was refluxed for two hours. The crystalline hydrobromide salt which formed was filtered from the reaction mixture and then digested with benzene. On filtration of the benzene from the hydrobromide salt, 12.1 grams or a yield of 67.2% of the desired hydrobromide salt of the benzhydryl ether was obtained. When this procedure was repeated replacing the naphtha with xylene, essentially the same excellent results were obtained.

*Example IV*

Benzhydryl chloride was reacted with 1-isopropyl-4-piperidinol to produce the benzhydryl ether thereof by heating a mixture of 7.6 grams of benzhydryl chloride (0.0375 mol), and 4.64 grams of tributylamine (0.025 mol) at 175° C. for 6 hours. The homogeneous reaction mixture was diluted with 50 ml. of methyl isobutyl ketone and then cooled. The crystalline hydrochloride salt of the desired ether which had formed was filtered from the mixture and washed with cold methyl isobutyl ketone. The hydrochloride of the desired ether was obtained in a yield of 7.73 grams which was 89.5% of the theoretical yield. It melted at 190°–193° C. and on recrystallization from a mixture of isopropanol and naphtha the melting point of the hydrochloride salt was raised to 192°–194° C.

*Example V*

The benzhydryl ether of 1-cyclohexyl-4-piperidinol was prepared by refluxing a mixture of 7 grams of 1-cyclohexyl-4-piperidinol (0.038 mol), 18.5 grams of benzhydryl bromide (0.075 mol), 9.27 grams of tributylamine (0.05 mol) and 25 ml. of methyl isobutyl ketone for four hours. Crystallization of the hydrobromide salt of the ether took place after about one hour of refluxing. The reaction mixture was cooled, the crystalline hydrobromide salt of the benzhydryl ether filtered therefrom and the salt washed with cold methyl isobutyl ketone. The hydrobromide salt of the desired benzhydryl ether was obtained in a yield of 16.4 grams which was 100% of the theoretical yield. The product was made up of colorless needles having a melting point of 228–231° C. On recrystallization from isopropanol, a yield of 93% of the pure hydrobromide salt melting at 232–234° C. was obtained.

Example VI 4.78 grams of 1-benzyl-4-piperidinol (0.025 mol), 7.58 grams of benzhydryl chloride (0.0375 mol) and 4.64 grams of tributylamine (0.025 mol) were heated at 150–155° C. for five hours. A heavy crystalline precipitate formed within an hour. At the end of the five hour heating period, 25 ml. of methyl isobutyl ketone were admixed with the mixture and the mixture then refluxed for half an hour. Thereafter the mixture was chilled to 5° C. and filtered and the crystalline hydrochloride salt of the benzhydryl ether washed with methyl isobutyl ketone. The desired ether was obtained in a yield of 90% of theory. Recrystallization of the hydrochloride salt of the ether from isopropanol gave 7.82 grams (81% of theory) of colorless needles melting at 246–248° C.

Example VII 3.56 grams of p-chlor-benzhydryl chloride (0.015 mol), 1.15 grams of 1-methyl-4-piperidinol (0.01 mol) and 1.86 grams of tributylamine (0.01 mol) were heated at 150–155° C. for 15 hours. The reaction mixture was then taken up in 5 ml. of methyl isobutyl ketone and 5 ml. of xylene. No crystalline salts formed in the mixture. Therefore the mixture was extracted first with water and then with dilute hydrochloric acid to separate the hydrochloride salt of the benzhydryl ether from the organic solvents. Tributylamine was separated from the reaction mixture as the hydrochloride salt along with the desired benzhydryl ether. The aqueous and dilute acid extracts were combined, filtered and made alkaline with 50% aqueous sodium hydroxide. The mixture of free organic bases separated from this alkaline mixture as an oily material. The free organic bases were then recovered from the alkaline mixture by extraction with benzene. The benzene extract was dried over sodium sulfate and evaporated to give an amber oil. This oil was added to a solution of 3 grams of citric acid in 30 ml. of warm isopropanol. The resulting mixture was then chilled to 5° C. whereupon a crystalline precipitate separated from the solution. This was the citrate salt of the desired benzhydryl ether. (The citrate salt of tributylamine is highly soluble in isopropanol and remains in solution.) On filtering the precipitate from the solution and washing it with cold isopropanol, 3.49 grams of a colorless powder was obtained which had a melting point of 195°–196° C. (with decomposition). A yield equal to 68.7% of the theoretical yield was obtained.

Example VIII 4.14 grams of p,p'-dichlor-benzhydryl chloride (0.015 mol), 1.15 grams of 1-methyl-4-piperidinol (0.01 mol) and 1.86 grams of tributylamine (0.01 mol) were heated at 175° C. for six hours and then taken up in xylene. As in Example VII, the hydrochloride salt of the benzhydryl ether did not form a crystalline product so the ether was converted to the citrate salt thereof by the same procedure as was employed in Example VII. The yield was 3.33 grams of an almost colorless powder having a melting point of 153–154° C. (decomp.). This was 61.5% of the theoretical yield. Attempts to prepare hydrohalide salts of this product gave non-crystalline oils.

Example IX

A reaction between 1-methyl-4-piperidinol and p-methoxy-benzhydryl chloride was carried out by heating a mixture of 0.01 mol (1.15 grams) of 1-methyl-4-piperidinol, 0.015 mol (3.48 grams) of p-methoxy-benzhydryl chloride, 0.01 mol (1.86 grams) of tributylamine and 10 ml. of methyl isobutyl ketone at reflux for 2 hours. A gummy precipitate formed almost immediately but it dissolved on refluxing the mixture and no further precipitation took place. The product was isolated as the free base in essentially the same manner as in Examples VII and VIII and converted to the maleate salt thereof by treating with a solution of maleic acid in isopropanol. The salt was obtained as colorless crystals melting at 137°–139° C., after recrystallization from isopropanol. Yield was 3.59 grams or 84% of the theoretical yield.

Example X

The p,p'-dimethoxy-benzhydryl ether of 1-methyl-4-piperidinol was prepared by reacting 9.85 grams of p,p'-dimethoxy-benzhydryl chloride (0.0375 mol) with 2.88 grams of 1-methyl-4-piperidinol (0.025 mol) in the presence of 4.64 grams of tributylamine (0.025 mol) and 20 ml. of methyl isobutyl ketone. The mixture was refluxed for only one hour. The reaction commenced on mixing the reagents at room temperature with separation of a fine precipitate which turned to an oil on heating and then redissolved followed by separation of the desired benzhydryl ether as the hydrochloride salt in about 15 minutes. The hydrochloride salt was filtered from the reaction mixture and washed with cold methyl isobutyl ketone. It had a melting point of 182°–184° C. The yield was 9.28 grams which was 98.5% of the theoretical yield. The melting point was not raised by recrystallization.

Example XI

The p-chlor-p'-methoxy-benzhydryl ether of 1-methyl-4-piperidinol was prepared by refluxing a mixture of 17.4 grams of crude p-chlor-p'-methoxy-benzhydryl chloride with 4.02 grams of 1-methyl-4-piperidinol, 6.53 grams of tributylamine and 25 ml. of methyl isobutyl ketone for six hours. A gummy material separated in a short time and redissolved after about one hour of heating at reflux. At the end of the heating period the reaction mixture was diluted with 25 ml. of xylene and cooled to 0° C. and the hydrochloride salt of the ether which separated was filtered therefrom and washed with cold methyl isobutyl ketone. The crystalline hydrochloride salt of the benzhydryl ether had a melting point of 158°–161° C. after one recrystallization from isopropanol-hexane. The yield obtained was 10.75 grams or 80.6% of the theoretical yield. The free base was prepared from this salt and found to be an oil. Treatment of the free base with anhydrous hydrobromic acid yielded the hydrobromide salt which melted at 161°–163° C. after recrystallization from isopropanolnaphtha.

Example XII

The hydrochloride salt of beta-dimethylaminoethyl benzhydryl ether was prepared by reacting 4.45 grams of dimethylaminoethanol (0.05 mol) with 15.2 grams of benzhydryl chloride (0.075 mol) in the presence of 9.27 grams of tributylamine (0.05 mol) by heating the reaction mixture at 125° C. for one hour and then at 150°–155° C. for five hours. On completion of the reaction, the reaction mixture was admixed with 25 ml. of methyl isobutyl ketone and chilled to 5° C. The hydrochloride salt of the desired ether separated from the mixture in crystalline form. The crystals were filtered from the solution and washed with methyl isobutyl ketone and hexane, and then were recrystallized from a mixture of 25 ml. of isopropanol and 75 ml. of heptane to give 10.32 grams of colorless needles melting at 165°–167° C. The yield of recrystallized material was 71% of the theoretical yield. A similar condensation employing benzhydryl bromide in place of the benzhydryl chloride gave a 71.5% yield of the recrystallized hydrobromide salt of the ether melting at 163°–165° C.

Example XIII 5.86 grams of diethylaminoethanol (0.05 mol), 15.2 grams of benzhydryl chloride (0.075 mol) and 9.27 grams of tributylamine (0.05 mol) were heated at 150°–155° C. for six hours. An oil separated from the reaction mixture shortly after heating commenced but it dissolved in the reaction mixture after about one hour of heating. At the end of the six hours of heating, the reaction mixture was admixed with 25 ml. of methyl isobutyl ketone giving a clear amber solution from which a crystalline precipitate settled in a few moments. The mixture was cooled to 5° C., filtered and the crystals which were thus isolated washed with methyl isobutyl ketone and heptane giving 14.4 grams of colorless needles having a melting point of 142°–145° C. The yield of the hydrochloride salt of the desired ether was thus 90.2% of the theoretical yield.

*Example XIV*

The procedure of Example XIII was repeated except that the tributylamine was replaced with an equivalent amount of benzyl dibutylamine. The desired hydrochloride salt of the benzhydryl ether was obtained in a yield of 90.5%.

*Example XV*

The procedure of Example XIII was repeated again with trioctylamine being used in this example to replace the tributylamine. The yield of the desired hydrochloride salt of the benzhydryl ether was 79% of the theoretical yield after recrystallization from isopropanol-naphtha.

*Example XVI*

When an equivalent amount of trihexylamine was used to replace the tributylamine in the procedure of Example XIII, the yield of the hydrochloride salt of the desired ether was 87.5% of the theoretical yield.

*Example XVII*

The benzhydryl ether of 3-(alpha-methylpiperidino) propanol was prepared by heating 3.93 grams of 3-(alpha-methylpiperidino) propanol (0.025 mol) with 7.58 grams of benzhydryl chloride (0.0375 mol) and 4.64 grams of tributylamine (0.025 mol) at 150°–155° C. for 19 hours. An oily material separated from the reaction mixture during the heating period and it did not dissolve in the reaction mixture on continued heating. At the end of the heating period, the reaction mixture was admixed with 25 ml. of methyl isobutyl ketone and cooled to 0° C. whereupon a crystalline precipitate formed. The precipitate was filtered from the reaction mixture and washed with methyl isobutyl ketone and hexane to give a light tan powder melting at 128°–131° C. The product was recrystallized from a mixture of 30 ml. of isopropanol and 100 ml. of heptane to give 6.3 grams of colorless needles having a melting point of 133°–135° C. The yield of the desired hydrochloride salt of the benzhydryl ether was 70% of the theoretical yield. Further recrystallization did not change the melting point of the hydrochloride salt.

*Example XVIII*

21.3 grams of crude p-brom benzhydryl chloride, 5.18 grams of 1-methyl-4-piperidinol and 8.35 grams of tributylamine were heated for 6 hours at 150°–155° C. As in the case of the product of Example VII, no crystalline hydrochloride salt of the benzhydryl ether could be isolated from the reaction mixture. Accordingly, the mixture was worked up for isolation of the free base and the latter converted to the citrate salt as in Example VII. The citrate salt of the desired benzhydryl ether was obtained in good yield as lustrous plates melting at 202°–203° C. (decomp.).

*Example XIX*

The process of Example X was repeated replacing the methyl isobutyl ketone with methyl ethyl ketone. Inasmuch as the boiling point of methyl ethyl ketone is only about 80° C., the reaction temperature in this example was considerably lower than in Example X. The desired hydrochloride salt of the benzhydryl ether was obtained but in a lower yield and in lower purity than in Example X. When the procedure of Example X was repeated employing isopropyl acetate (B. P. 89° C.) as a reaction medium, the results obtained were similar to those obtained with methyl ethyl ketone. It is apparent therefore that for the most efficient results, it is preferable to employ reaction temperatures of at least about 100° C. and preferably reaction temperatures of at least about 120° C. are employed.

Having described my invention what I claim as new and desire to secure by Letters Patent is:

1. A process for preparing benzhydryl ethers which comprises reacting a benzhydryl halide selected from the group consisting of substituted benzhydryl halides and unsubstituted benzhydryl halides, the substituted benzhydryl halides containing not more than one substituent radical in each phenyl group, said substituent radical being selected from the group consisting of halogen, methyl, ethyl, methoxy and ethoxy radicals, with an amino alcohol containing a tertiary amino group selected from the group consisting of piperidino alkanols, aliphatic amino alcohols, 1-methyl-4-piperidinol, 1-ethyl-4-piperidinol, 1-isopropyl-4-piperidinol, 1-cyclopentyl-4-piperidinol, 1-cyclohexyl-4-piperidinol, 1-phenyl-4-piperidinol, 1-benzyl-4-piperidinol, and 1-pyridyl-4-piperidinol in the presence of a tertiary amine selected from the group consisting of benzyl dibutylamine and tertiary alkyl amines, each of the alkyl radicals of the tertiary alkyl amines containing from 3 to 8 carbon atoms.

2. A process for preparing a benzhydryl ether comprising reacting a benzhydryl halide selected from the group consisting of substituted benzhydryl halides and unsubstituted benzhydryl halides, the substituted benzhydryl halides containing not more than one substituent radical in each phenyl group, said substituent radical being selected from the group consisting of halogen, methyl, ethyl, methoxy and ethoxy radicals, with an aliphatic amino alcohol in which the amino group is a tertiary amino group in the presence of a tertiary alkyl amine, each of the alkyl groups of the tertiary alkyl amine containing from 3 to 8 carbon atoms.

3. A process for preparing a benzhydryl ether comprising reacting a benzhydryl halide selected from the group consisting of substituted benzhydryl halides and unsubstituted benzhydryl halides, the substituted benzhydryl halides containing not more than one substituent radical in each phenyl group, said substituent radical being selected from the group consisting of halogen, methyl, ethyl, methoxy and ethoxy radicals, with a piperidino alkanol in the presence of a tertiary alkyl amine, each of the alkyl groups of the tertiary alkyl amine containing from 3 to 8 carbon atoms.

4. A process for preparing a benzhydryl ether comprising reacting a benzhydryl halide selected from the group consisting of substituted benzhydryl halides and unsubstituted benzhydryl halides, the substituted benzhydryl halides containing not more than one substituent radical in each phenyl group, said substituent radical being selected from the group consisting of halogen, methyl, ethyl, methoxy and ethoxy radicals, with an aliphatic amino alcohol in which the amino group is a tertiary amino group in the presence of tributyl amine.

5. A process for preparing a benzhydryl ether comprising reacting a benzhydryl halide selected from the group consisting of substituted benzhydryl halides and unsubstituted benzhydryl halides, the substituted benzhydryl halides containing not more than one substituent radical in each phenyl group, said substituent radical being selected from the group consisting of halogen, methyl, ethyl, methoxy and ethoxy radicals, with a piperidino alkanol in the presence of tributyl amine.

6. The process of claim 2 wherein the reaction is carried out in methyl isobutyl ketone.

7. The process of claim 3 wherein the reaction is carried out in methyl isobutyl ketone.

8. The process comprising reacting benzhydryl chloride with 1-methyl-4-piperidinol in the presence of tributyl amine.

9. A process comprising reacting p-methoxy benzhydryl chloride with 1-methyl-4-piperidinol in the presence of tributyl amine.

10. A process comprising reacting p-chlor benzhydryl chloride with 1-methyl-4-piperidinol in the presence of tributyl amine.

11. A process comprising reacting p,p'-dimethoxy benzhydryl chloride with 1-methyl-4-piperidinol in the presence of tributyl amine.

12. A process comprising reacting benzhydryl chloride with dimethyl amino ethanol in the presence of tributyl amine.

References Cited in the file of this patent

UNITED STATES PATENTS

| | | |
|---|---|---|
| 2,387,435 | Fleysher | Oct. 23, 1945 |
| 2,421,714 | Rieveschl | June 3, 1947 |
| 2,427,878 | Rieveschl | Sept. 23, 1947 |
| 2,454,092 | Rieveschl | Nov. 16, 1948 |
| 2,479,843 | Knox et al. | Aug. 23, 1949 |
| 2,567,351 | Rieveschl | Sept. 11, 1951 |

FOREIGN PATENTS

| | | |
|---|---|---|
| 886,009 | France | June 15, 1943 |

OTHER REFERENCES

Palit: Jour. Ind. Chem. Soc., vol. 25 (No. 31, 1948), pp. 127–38.

Huber: Thesis, The Preparation of Some New Antispasmodics, Library, U. of Cincinnati (Ohio), May 28, 1943, pp. 52–53.

Idson: Chem. Reviews, vol. 47, p. 318 (1950).